US012779472B2

(12) United States Patent
Löhr et al.

(10) Patent No.: US 12,779,472 B2
(45) Date of Patent: Nov. 3, 2026

(54) MATERIAL PROCESSING UNIT AND METHOD OF OPENING AND CLOSING A HOUSING PART OF A HOUSING OF A MATERIAL PROCESSING UNIT

(71) Applicant: Kleemann GmbH, Göppingen (DE)

(72) Inventors: Felix Löhr, Welzheim (DE); Christian Schlecht, Aalen (DE); Christian Weller, Esslingen (DE)

(73) Assignee: Kleemann GmbH, Göppingen (DE)

( * ) Notice: Subject to any disclaimer, the term of this patent is extended or adjusted under 35 U.S.C. 154(b) by 460 days.

(21) Appl. No.: 18/494,556

(22) Filed: Oct. 25, 2023

(65) Prior Publication Data

US 2024/0139753 A1 May 2, 2024

(30) Foreign Application Priority Data

Oct. 28, 2022 (DE) ..................... 10 2022 128 776.9

(51) Int. Cl.
*B02C 13/31* (2006.01)
*B02C 13/09* (2006.01)
*B02C 21/02* (2006.01)

(52) U.S. Cl.
CPC ............ *B02C 13/31* (2013.01); *B02C 13/095* (2013.01); *B02C 21/02* (2013.01)

(58) Field of Classification Search
CPC .......... B02C 2/02; B02C 13/095; B02C 13/31
USPC ............................................................ 81/488
See application file for complete search history.

(56) References Cited

U.S. PATENT DOCUMENTS

| | | | | |
|---|---|---|---|---|
| 4,398,674 | A | 8/1983 | Dremann | |
| 8,505,843 | B2 * | 8/2013 | Veneroso | B02C 13/20 241/285.3 |
| 11,078,024 | B2 | 8/2021 | Geywitz et al. | |
| 2004/0251346 | A1 | 12/2004 | Verhoef et al. | |

(Continued)

FOREIGN PATENT DOCUMENTS

| | | | |
|---|---|---|---|
| CN | 112295710 | A | 2/2021 |
| JP | 2006110421 | A | 4/2006 |
| WO | 2021176136 | A1 | 9/2021 |

OTHER PUBLICATIONS

Offfice action from corresponding German patent application No. 10 2022 128 776.9, dated Sep. 8, 2023, 10 pages (not prior art).

(Continued)

*Primary Examiner* — Katina N. Henson
(74) *Attorney, Agent, or Firm* — Lucian Wayne Beavers; Patterson Intellectual Property Law, PC

(57) ABSTRACT

A material processing unit has a movable tool accommodated in a housing. The housing includes a housing part which can be moved between an open position and a closed position relative to a further housing part. A safety device prevents any opening of the housing when the tool is driven and/or prevents any driving in the open position. The safety device includes at least two actuators and a controller. A first actuator locks the housing part in the closed position. A second actuator causes, supports and/or permits a movement of the housing part. Sensors are assigned to the actuators. A controller is designed to control the drive and the actuators and to receive the actuation states detected by the sensors. A method for opening/closing a housing of a material processing unit is also provided.

16 Claims, 4 Drawing Sheets

(56) References Cited

U.S. PATENT DOCUMENTS

| | | | | |
|---|---|---|---|---|
| 2006/0086850 | A1* | 4/2006 | Cohen | B02C 13/31 241/189.1 |
| 2023/0092458 | A1* | 3/2023 | Heikkilä | B02C 13/02 241/30 |

OTHER PUBLICATIONS

China Office action from corresponding patent application No. 2026061801165860, dated Jun. 18, 2026, 7 pages (not prior art).

* cited by examiner

MATERIAL PROCESSING UNIT AND METHOD OF OPENING AND CLOSING A HOUSING PART OF A HOUSING OF A MATERIAL PROCESSING UNIT

RELATED APPLICATIONS

The present application claims priority to German Patent Application Ser. No. DE 10 2022 128 776.9, filed Oct. 28, 2022, which is incorporated herein by reference.

BACKGROUND OF THE DISCLOSURE

Field of the Disclosure

The invention relates to a material processing unit, in particular a crusher unit, having a housing, in which at least one movable tool driven by a drive, in particular an impact rotor, a crushing jaw or a crushing cone, is at least partially accommodated in a mounting space, in particular a crushing space, wherein the housing has a housing part, which can be moved between an open and a closed position relative to at least one further housing part, and which in the open position provides access to the mounting space, wherein a safety device is provided, which prevents the housing part from being moved into the open position when the tool is driven and/or prevents the tool from being driven by the drive in the open position of the housing part.

The invention also relates to a method for opening and closing a housing part of a housing of a material processing unit.

DESCRIPTION OF THE PRIOR ART

From WO 2021/176136 (US 2023/092458) a rotary impact crusher unit having a housing is known. A crushing chamber, in which an impact rotor is mounted for rotation by means of a horizontal shaft, is formed inside the housing. The impact rotor has impact elements on its outer circumference. The unit has a maintenance hatch that can be opened to provide access to the crushing chamber. A restraining device is also provided to prevent the maintenance flap from opening when the horizontal shaft is driven or may start moving due to an imbalance. The restraining device comprises a first restraining element and a second restraining element. The first restraining element is supported between a blockade position and an access position in a swiveling manner, wherein the first restraining element in the blockade position prevents access to the crushing chamber through the maintenance flap. The second restraining element is also swivel mounted and, in a control position, engages with the horizontal shaft by means of an engagement element to prevent any uncontrolled rotation thereof. In an operating position, the second restraining element is swiveled away from the horizontal shaft, i.e., the engagement element is not engaged. The swiveling paths of the restraining elements are disposed in such a way that the second restraining element in the operating position blocks any swiveling of the first restraining element into the access position. Further, the first restraining element blocks the second restraining element from swiveling into the operating position when it is in the access position.

SUMMARY OF THE DISCLOSURE

The invention addresses the problem of providing a material processing unit having a safety device that provides a robust design and function, in addition to a safe and user-friendly opening and closing of the housing.

The invention also addresses the problem of providing a method for safe and user-friendly opening and closing of a housing part of a housing of a material processing unit.

The problem relating to the material processing unit is solved in that the safety device comprises at least two actuator units and a controller, wherein the first actuator unit locks the housing part in the closed position in a locked actuation state and unlocks it in an unlocked actuation state, in that a second actuator unit causes and/or supports or at least permits a movement of the housing part, wherein the second actuator unit takes a closed actuation state in the closed position of the housing part and an open actuation state in the open position, in that at least one sensor each is assigned to the at least two actuator units for detecting an actuation state, and in that the controller is designed to control the drive and the actuator units and to receive the actuation states detected by the sensors.

The first actuator unit can thus be used to hold the housing securely in a closed position. Furthermore, the first actuator unit can be used to conveniently perform the locking and unlocking of the housing part. For instance, a user does not have to perform the locking and/or unlocking manually. In particular, the controller can be used to control the first actuator unit accordingly. Preferably, a user can act on the controller, in particular by means of a control panel or an external input/output device, to cause a movement of the first actuator unit. The controller may preferably have a software.

Likewise, opening and closing the housing can be performed safely and conveniently using the second actuator unit. Thus, opening and closing does not have to be performed manually. This can be particularly advantageous if the housing is of split design, for instance, wherein the movable housing part is swivel mounted relative to the further housing part, for instance. In such a case, the housing part may have significant weight and geometric dimensions, which may pose a safety risk to a user during manual opening and/or closing. Of course, it is also conceivable that the movable housing part is designed as a flap or door and/or is provided so as to be displaceable relative to the further housing part. In that case, as well, convenient operation results from the second actuator unit.

As in the case of the first actuator unit, a user can cause a movement of the second actuator unit by means of the controller, for instance via a control panel or an external input/output device.

The sensors assigned to the actuator units can, for instance, be displacement measuring systems or position measuring systems, in particular end position measuring systems.

It is of course conceivable that more than one first actuator unit and/or more than one second actuator unit each are provided. Accordingly, it may be possible to provide redundant actuator units and/or to dimension actuator units correspondingly smaller. Actuator units can also be provided at several force transfer points on the housing in a mechanically favorable manner, for instance with respect to a plane oriented perpendicular or transverse to a swivel axis of the housing part, on either side of the housing.

The controller can detect the actuation states of the actuator units detected by the sensors. The controller can also control the drive. Accordingly, the controller can be designed in such a way that, depending on the actuation states of the actuator units and the operating state of the drive, in particular only actuating processes that do not represent an increased safety risk are permitted. Preferably, suitable software of the controller can be used for this purpose.

In addition, the controller can also be designed to detect a state of motion of the tool. For instance, the tool may be in motion even when the drive is deactivated, in particular after the drive has been deactivated due to its inertial mass, particularly in the case of an impact rotor or a crushing jaw that may be coupled to a flywheel. Furthermore, even when the drive is deactivated, material to be machined can be located in the area of the tool and exert mass forces on the tool to keep and/or set it in motion.

Thus, the motion state of the tool can also be taken into account by the controller, in particular to permit only safe positioning operations that do not pose an increased safety risk. Preferably, a software of the controller is designed to permit only safe positioning operations.

According to the invention, provision may be made for the controller to permit a movement of the second actuator unit only when the first actuator unit is in the unlocked actuation state. In that way, any damage to the first actuator unit, the second actuator unit and/or the housing can be prevented.

According to a preferred embodiment of the invention, it is proposed to provide a tool setting device, which, in an engaged position, is in engagement with an element of a drive train of the tool, in particular with a rotor shaft or a drive disk, wherein the tool setting device in the engaged position prevents driving of the tool caused by the drive and/or a motion of the tool caused by inertial forces.

In this way, a means of preventing unwanted motion of the tool can be provided. Significant risk of injury to users can result from an unwanted motion of the tool, for instance when maintenance work is to be performed inside the housing.

Provision may be made in particular for a third actuator unit to be provided, wherein the third actuator unit can assume an engagement actuation state and/or a release actuation state, and for the third actuator unit in the engagement actuation state to block the tool setting device in the engaged position and/or to release it in the release actuation state. In this way, it can be ensured that the tool setting device is in the engaged position, and thus the tool cannot move unintentionally. The actuation state of the third actuator unit can also be determined by means of a sensor and transmitted to the controller. Thus, the controller can also take into account the actuation state of the third actuator unit. It can therefore be determined whether the tool is in a safe, preferably locked position.

According to the invention, to ensure that the tool is not driven when access to the interior of the housing is provided, provision may be made for the controller to permit the tool to be driven only when the first actuator unit is in the locked actuation state and the second actuator unit is in the closed actuation state.

Preferably, further provision may be made for the controller to permit a drive of the tool only when the/a third actuator unit is in the/a release actuation state. Thus, damage to the third actuator unit and/or the drive and or a drive train between the drive and the tool can be prevented.

One variant of the invention can be such that the controller only permits the first actuator unit to be moved to the unlocked actuation state and/or the second actuator unit to be moved to the open actuation state when the third actuator unit is in the engagement actuation state. This ensures that the housing can only be opened when the tool is secured against unintentional motion.

Preferably, provision may also be made for the first actuator unit to be only moved to the locked actuation state when the second actuator unit is in the closed actuation state. On the one hand, this prevents damage to the first actuator unit. On the other hand, it can also be ensured that a presence of the first actuator unit in the locked actuation state actually means a locked housing. Thus, the transmission of erroneous and/or ambiguous signals about the actuation state of the first actuator unit to the controller can be prevented.

A variant of the invention may be characterized in that the controller permits a movement of the first actuator unit into the unlocked actuation state and/or a movement of the second actuator unit into the open actuation state and/or a movement of the/a third actuator unit into the/a engagement actuation state only when the tool is not driven, preferably when the tool is not in motion. For instance, the controller can determine whether the drive is deactivated and/or whether the tool is at a standstill. In that case, there can be a state that permits the housing to be opened safely, and in which a movement of the first actuator unit to the unlocked actuation state and/or a movement of the second actuator unit to the open actuation state and/or a movement of the/third actuator unit to the/an engagement actuation state can thus be permitted.

According to a preferred embodiment of the invention, it is proposed that the first actuator unit has an actuator element and a locking element, which can be moved between the locked actuation state and the unlocked actuation state with respect to the actuator element, and that the locking element and a counter locking element form a frictional and/or form-locked connection between the housing part and the further housing part to interlock the housing parts in the closed position in a locked actuation state.

It is conceivable that the first actuator unit is provided on the housing part and the counter locking element is provided on the further housing part. Conversely, however, it is also conceivable that the first actuator unit is provided on the further housing part and the counter locking element is provided on the housing part.

The actuator element can preferably have a hydraulic cylinder, in particular preferably a double-acting hydraulic cylinder, or be designed as such. In this case, the hydraulic cylinder can preferably be secured by means of a lowering/braking load-holding valve. Preferably, the locking element can be coupled to a transmission element, in particular to a piston rod.

The sensor assigned to the first actuator unit can preferably be designed as a displacement measuring system. In that case, the displacement measuring system can determine whether the first actuator unit is in the locked actuation state or in the release actuation state on the basis of this displacement of the locking element and/or the transmission element relative to the actuator element. However, it is also conceivable to use other types of sensors, such as proximity switches or light barriers.

For a low actuating force of the first actuator unit, a secure locking of the housing parts can be achieved in a simple manner if provision is made for the locking element to have a wedge surface, for the counter locking element to have a wedge mount, for the locking element to be guided at least partially into the wedge mount when the housing part is in the closed position during a movement of the first actuator unit from the unlocked actuation state into the locked actuation state, wherein a wedge connection is formed by the interaction of the locking element with the counter locking element to interlock the housing parts in the closed position.

A wedge connection provides the option of achieving a high transverse force of the connection with a low force required to move the locking element along its travel path. In particular, the wedge connection can be used to achieve bracing between the housing parts so that they are not only interlocked but are also pressed against each other by a clamping force. In this way, a largely flush finish can be achieved between the housing parts, even if, for instance, the housing parts do not fit perfectly together due to contamination, tolerances and/or deformations that occur. In other words, the bracing can reduce a gap between the housing parts.

Furthermore, a wedge splice is also less susceptible to contamination and is therefore particularly suitable for use in material processing units.

It is also conceivable to make the wedge connection self-locking by a suitable choice of the angle of inclination of the wedge surface of the locking element, such that the locking element is held securely in the wedge mount even if the first actuator unit is powerless, for instance in the event of a failure. In this way, increased safety against any opening of the housing in unsafe operating conditions can be achieved.

Opening and/or closing can be rendered possible in a structurally simple manner if provision is made for the second actuator unit to have an actuator element and a transmission element, which can be moved between the open actuation state and the closed actuation state with respect to the actuator element, for the actuator element to be connected, preferably swivel connected, on the one hand to the housing part or to the further housing part and on the other hand for the transmission element to be connected, preferably swivel-connected, to the further housing part or to the housing part.

As described above for the first actuator unit, the actuator element can preferably have or be designed as a hydraulic cylinder, particularly preferably a double-acting hydraulic cylinder, and can further preferably be secured by means of a lowering/braking load-holding valve. In this case, the transmission element can be designed as or have a piston rod.

The embodiments of the sensors of the first actuator unit proposed above may also be applicable to the second actuator unit. Accordingly, the sensor can preferably be designed as a displacement measuring system, wherein the displacement measuring system can determine whether the second actuator unit is in the closed actuation state or in the open actuation state on the basis of the present displacement path of the transmission element relative to the actuator element. However, in this case it is also conceivable to use other types of sensors, such as proximity switches or light barriers. Of course, for the second actuator unit different sensors can be used than for the first actuator unit.

According to a preferred embodiment of the invention, it is proposed that the tool setting device can be swiveled about a swivel axis between the release position and the engaged position, that the tool setting device comprises an eccentric shaft, which is mounted for rotation about an eccentric axis spaced apart from the swivel axis, and that a rotation of the eccentric shaft causes a swiveling of the tool setting device between the release position and the engaged position.

Thus, the tool setting device can be swiveled about the swivel axis towards the element of the drive train of the tool with which it is engaged in the engaged position. By swiveling away from the element of the drive train, the tool setting device can again be disengaged therefrom.

The eccentric shaft can preferably be rotated manually, particularly preferably by means of an operating element, in particular a crank. However, it is also conceivable that the eccentric shaft is rotated by means of an auxiliary drive, for instance by means of an electric motor. In particular, it is conceivable that the auxiliary drive can be controlled by the control unit.

According to an advantageous further development of the invention, it is proposed that the third actuator unit comprises a base body and a locking means, which can be moved between the engagement actuation state and the release actuation state along a displacement path relative to the base body.

A simple, cost-effective and safe movability that is unaffected by contamination can be achieved in particular if provision is made for the third actuator unit to be designed as a locking magnet, in particular for the base body to comprise an electromagnet and the locking means to be coupled to an armature rod of the locking magnet or to be formed by such an armature rod.

According to an advantageous further development of the invention, it is proposed that the eccentric shaft has a mount, in particular in the form of a bore, oriented along a mounting axis, wherein the mounting axis is preferably oriented perpendicular to the eccentric axis, that the locking means is designed to engage with the mount in the engagement actuation state to block rotation of the eccentric shaft about the eccentric axis, and that the locking means in the mount can engage only with the mount when the tool setting device is in the engaged position. In particular, for this purpose provision may be made for the displacement path of the locking means to be aligned with the receiving axis when the tool setting device is in the engaged position.

This results in a safe locking of the tool setting device in the engaged position. In addition, it is ensured that the third actuator unit can only be in the engagement actuation state when the tool setting device is in the engaged position, i.e. the tool is secured against unintentional motion. Accordingly, a signal transmitted to the controller by the sensor assigned to the third actuator unit can provide unambiguous information as to whether the tool is secured via its actuation state.

The previously proposed embodiments of the sensors of the first and/or second actuator unit may also be applicable to the third actuator unit. Accordingly, the sensor can preferably be designed as a displacement measuring system, wherein the displacement measuring system determines on the basis of this displacement path whether the third actuator unit is in the engagement actuation state or in the release actuation state of the locking means relative to the base body. However, in this case it is also conceivable to use other types of sensors, such as proximity switches or light barriers. It is also conceivable that different sensors than those of the first and/or second actuator unit(s) are assigned to third actuator unit.

For maintenance purposes in particular, it can be advantageous if the tool can be secured against unintentional motion but can be moved in a controlled manner. For instance, it may be necessary to slightly rotate an impact rotor to provide access to impact bars that may need to be replaced. According to a preferred embodiment of the invention, it is therefore proposed that a motion of the tool can be caused by means of the tool setting device when the tool is not driven by the drive. Accordingly, it is not necessary to cause the desired motion of the tool by means of the drive. This is particularly advantageous, in particular because drives of material processing units can often provide large drive powers and/or torques, which can pose a safety risk to a user. Therefore, a relatively low power or torque is preferably provided for controlled motion of the tool. It is particularly advantageous in this context if provision is made for the motion of the tool to be caused manually by means of the tool setting device.

One embodiment of the invention may be such that the tool setting device comprises a pinion gear engaged with a gear rim when the tool setting device is in the engaged position, wherein the gear rim is provided on the/a drive disk coupled to the tool.

If a belt drive is provided for driving the tool, which provides a transmission ratio between the drive and the tool, the drive disk can be a belt pulley, for instance, on which a drive belt can run. However, it is also conceivable that a gearbox can be provided between the drive and the tool. In this case, the drive disk can be designed as a gear.

If further provision is made for the tool setting device to have a setting means, preferably in the form of a crank, having a shaft, and for a rotation of the shaft to be translated into a rotation of the pinion by means of a gearbox, a motion of the tool can be accomplished in a controlled manner and using low operating forces.

Preferably, further provision may be made for the gearbox to be self-locking, such that a rotation of the shaft of the setting means cannot be caused by a rotation of the pinion. It is conceivable, for instance, that the gearbox is designed as a worm gear. Self-locking can ensure that the tool does not move unrequested, while still making it easy to achieve a desired motion. Also, the setting means is prevented from making any uncontrolled motions, in particular if it is designed as a crank and a user releases the crank after operating it.

According to the invention, opening comprises the steps listed below:

- deactivate the drive,
- move the first actuator unit into the unlocked actuation state,
- move the second actuator unit into the open actuation state.

Closing comprises the steps listed below:

- move the second actuator unit to the closed open actuation state,
- move the first actuator unit to the locked open actuation state.

Thus, during an opening process, the drive is first deactivated, preferably by the controller, wherein deactivation of the drive shall also be understood as a determination that the drive is already deactivated. The first actuator unit can then be unlocked, preferably controlled by the controller, such that an opening of the housing part can then be caused by means of the movement of the second actuator unit, wherein the movement of the second actuator unit again is preferably controlled by the controller.

During a closing process, the housing part can first be closed by means of the second actuator unit, preferably controlled by the controller. Subsequently, the first actuator unit, preferably controlled by the controller, can cause the locking of the housing parts.

According to an advantageous further development of the invention, it is proposed that during opening, before the first actuator unit is moved into the unlocked actuation state, the/a third actuator unit is moved into the/a engagement actuation state, and that during closing, after the first actuator unit has been moved into the locked actuation state, the second actuator unit is moved into the release actuation state.

The movement of the third actuator unit can also preferably be controlled by the controller.

The controller can determine the actuation state of the actuator units on the basis of the sensors assigned to the actuator units. In particular, the controller can preferably only permit the execution of a next step if the actuator unit moved in the previous step is in a permissible actuation state.

It is conceivable that a user of the material processing unit can initiate individual, several or all of the above steps for opening and/or closing the housing part via the controller. However, it is also conceivable that the user only specifies to the controller that the housing part is to be opened or closed, and that the controller performs the necessary steps. For instance, a control panel or an external input/output device may be provided for interaction between the user and the controller.

BRIEF DESCRIPTION OF THE DRAWINGS

The invention is explained in greater detail below based on an exemplary embodiment shown in the drawings. In the figures.

DETAILED DESCRIPTION

Figure 1:
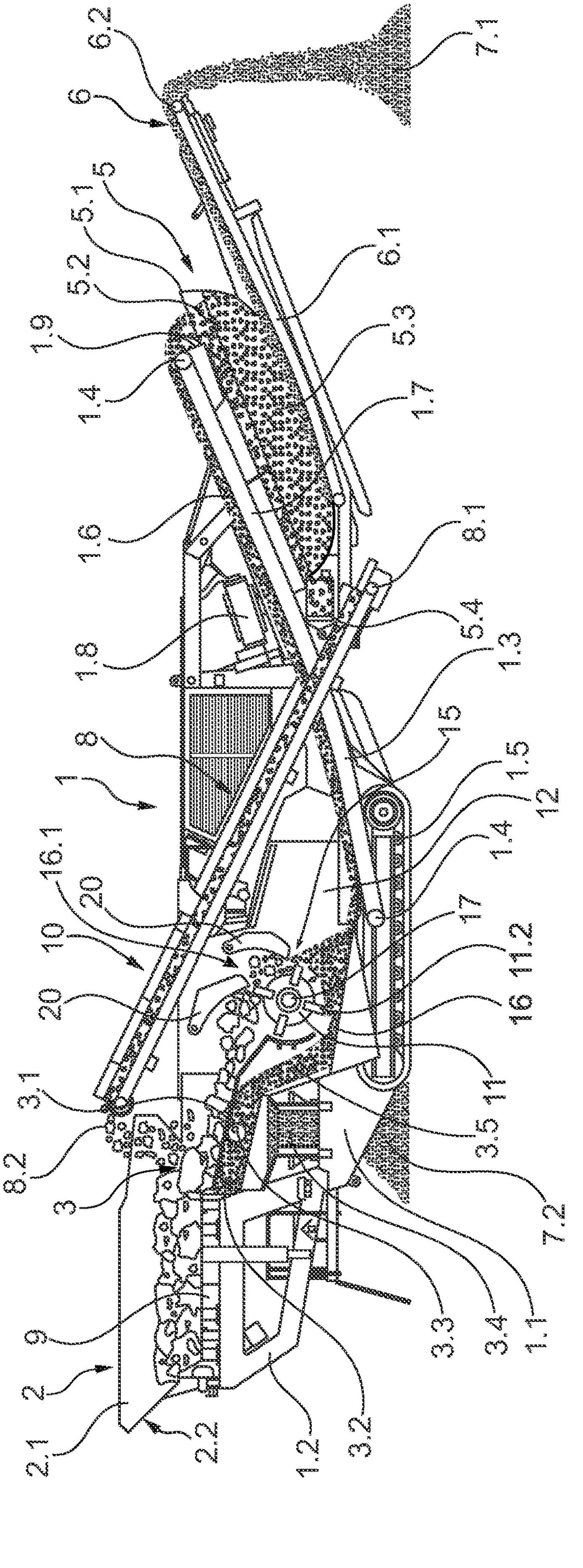
FIG. 1 shows a side view of a schematic representation of a material processing device 1 having a crusher unit 10.

FIG. 1 shows a material processing device 1 in the form of a crusher having a material processing unit in the form of a crusher unit 10. The material processing device is designed as a mobile material processing device and therefore has undercarriages 1.5. However, it is also conceivable that the material processing device 1 is a stationary material processing device 1.

The material processing device 1 has a chassis 1.1 that bears the machine components or at least a part of the machine components. At its rear end, the chassis 1.1 has a cantilever 1.2. A material feed area is formed in the area of the cantilever 1.2.

The material feed area comprises a feed hopper 2 and a material feed device 9.

The feed hopper 2 may be formed at least in part by hopper walls 2.1 extending in the direction of the longitudinal extent of the material processing device 1 and a rear wall 2.2 extending transversely to the longitudinal extent. The feed hopper 2 leads to a material feed device 9.

As shown in this exemplary embodiment, the material feed device 9 comprise have a conveyor chute that can be driven by means of a vibratory drive. The feed hopper 2 can be used to feed material to be comminuted into the material processing device 1, for instance using a wheel loader, and to feed it onto the conveyor chute.

From the conveyor chute, the material to be comminuted passes into the area of a screen unit 3. This screen unit 3 may also be referred to as a pre-screening arrangement. At least one screen deck 3.1, 3.2 is disposed in the area of the screen unit 3. In this exemplary embodiment two screen decks 3.1, 3.2 are used.

A partial fraction of the material to be comminuted is screened out at the upper screen deck 3.1. This partial fraction already has a sufficient particle size that it no longer needs to be comminuted in the material processing device 1. In this respect, this screened out partial fraction can be routed past a crusher unit 10 through a bypass channel 3.5.

If a second screen deck 3.2 is used in the screen unit 3, a further fine particle fraction can be screened out from the partial fraction that accumulates below the screen deck 3.1. This fine particle fraction can be routed to a lateral discharge conveyor 3.4 below the screen deck 3.2. The fine particle fraction is diverted from the lateral discharge conveyor 3.4 and conveyed to a rock pile 7.2 located laterally of the machine.

As FIG. 1 illustrates, the screen unit 3 may be a vibrating screen having a screen drive 3.3. The screen drive 3.3 causes the screen deck 3.1 and/or the screen deck 3.2 to vibrate. Owing to the inclined arrangement of the screen decks 3.1, 3.2 and in conjunction with the vibration motions, material on the screen decks 3.1, 3.2 is transported towards the crusher unit 10 or towards the bypass channel 3.5.

The material to be comminuted 3.1 is routed from the screen deck to the crusher unit 10, as shown in FIG. 1.

The crusher unit 10 may be designed to be a rotary impact crusher unit. The crusher unit 10 then has an impact rotor 11 driven by a drive 12. The drive 12 may be any suitable power source including an internal combustion engine, an electric motor, or a hydraulic motor. In FIG. 1, the axis of rotation 17 of the impact rotor 11 extends horizontally in the direction of the image depth.

For instance, the outer periphery of the impact rotor 11 may be equipped with impact bars 11.2. Opposite from the impact rotor 11, for instance, wall elements may be disposed, preferably in the form of impact rockers 20. When the impact rotor 11 is rotating, the impact bars 11.2 throw the material to be comminuted outwards. In so doing, this material hits the impact rockers 20 and is comminuted due to the high kinetic energy. When the material to be comminuted is of sufficient particle size to permit the material particles to pass through a crushing gap 15 between the impact rockers 20 and the radially outer ends of the impact bars 11.2, the comminuted material exits the crusher unit 10 through the crusher outlet 16.

It is conceivable that in the area of the crusher outlet 16, the comminuted material routed from the crusher unit 10 is combined with the material routed from the bypass channel 3.5 and transferred onto a belt conveyor 1.3. The belt conveyor 1.3 can be used to convey the material out of the working area of the crusher unit 10.

As shown in the drawings, the belt conveyor 1.3 may comprise an endless circulating conveyor belt having a slack side 1.6 and a tight side 1.7. The slack side 1.6 is used to catch and transport away the crushed material falling from the crusher outlet 16 of the crusher unit 10. At the belt ends, deflection rollers 1.4 can be used to deflect the conveyor belt from the slack side 1.6 to the tight side 1.7 and vice versa. Guides, in particular support rollers, can be provided in the area between the deflection rollers 1.4 to change the direction of conveyance of the conveyor belt, to shape the conveyor belt in a certain way and/or to support the conveyor belt.

The belt conveyor 1.3 has a belt drive, which can be used to drive the belt conveyor 1.3. The belt drive can preferably be disposed at the discharge end 1.9 or in the area of the discharge end 1.9 of the belt conveyor 1.3.

Figure 8:
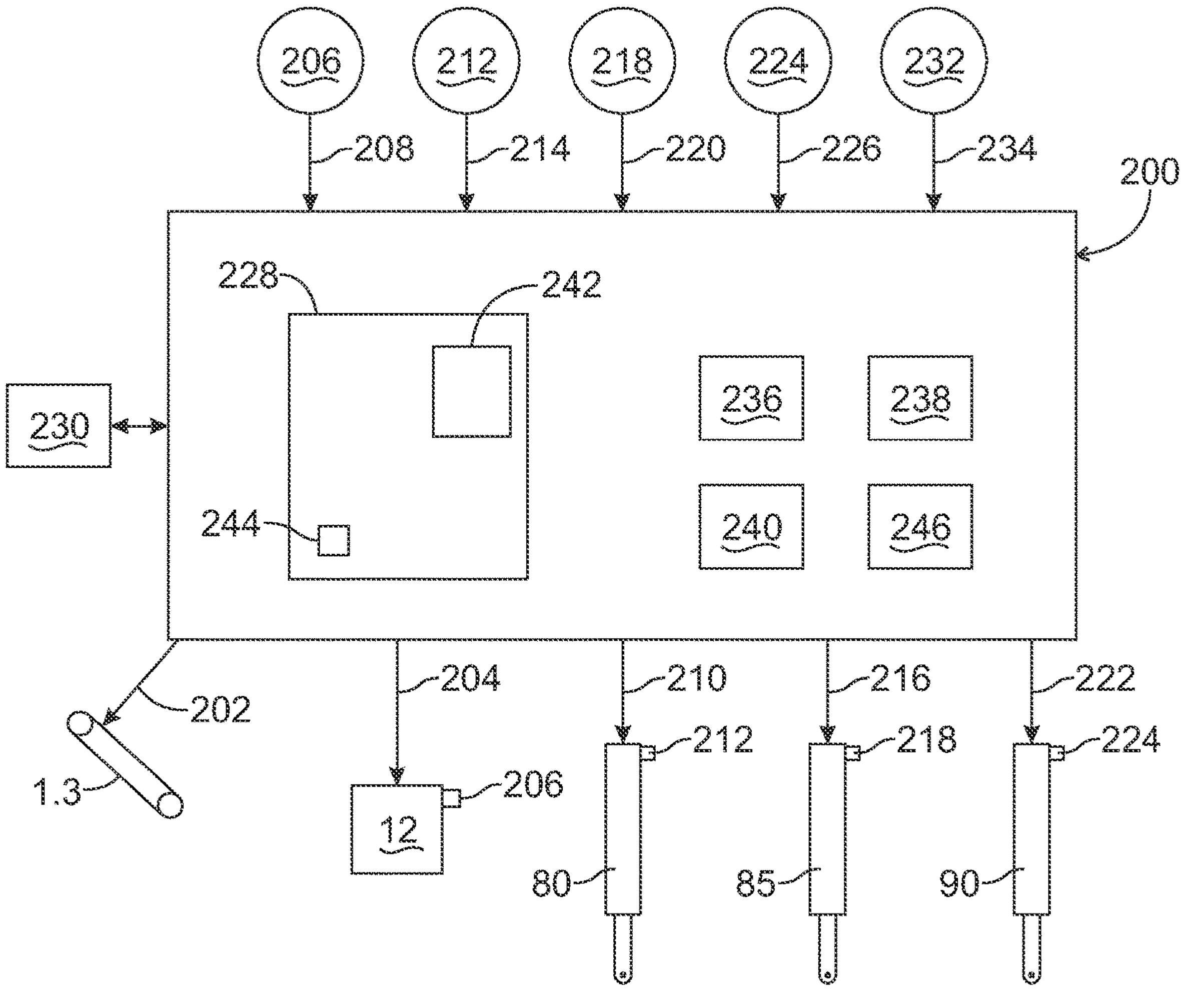
FIG. 8 shows a schematic representation of the controller and associated sensors and actuators.

The belt conveyor 1.3 can be connected, for instance by means of the belt drive, to a controller 200 by means of a control line 202. The controller 200 and associated sensors and actuators are shown schematically in FIG. 8.

One or more further belt conveyors 6 and/or a return conveyor 8 may be used, which in principle have the same design as the belt conveyor 1.3. In this respect, reference can be made to the above statements.

A magnet 1.8 can be disposed above the slack side 1.6 in the area between the feed end and the discharge end 1.9. The magnet 1.8 can be used to lift iron parts from the broken material and move them out of the conveying area of the belt conveyor 1.3.

A re-screening device 5 can be disposed downstream of the belt conveyor 1.3. The crusher unit 5 has a screen housing 5.1, in which at least one screen deck 5.2 is mounted. Below the screen deck 5.2, a housing base 5.3 is formed, which is used as a collection space for the material screened out at the screen deck 5.2.

An opening in the lower housing part 5.3 creates a spatial connection to the further belt conveyor 6. Here, the further belt conveyor 6 forms its feed area 6.1, wherein the screened material in the feed area 6.1 is directed onto the slack side of the further belt conveyor 6. The further belt conveyor 6 conveys the screened material towards its discharge end 6.2. From there, the screened material is transferred to a rock pile 7.1.

The material not screened out at the screen deck 5.2 of the re-screening device 5 is conveyed from the screen deck 5.2 onto a branch belt 5.4. The branch belt 5.4 can also be designed as a belt conveyor, i.e., reference can be made to the explanations given above with respect to the belt conveyor 1.3. In FIG. 1, the transport direction of the branch belt 5.4 extends in the direction of the image depth.

At its discharge end, the branch belt 5.4 transfers the un-screened material, also referred to as oversize material, to the feed area 8.1 of the return conveyor 8. The return conveyor 8, which may be a belt conveyor, conveys the oversize material towards the feed hopper 2. At its discharge end 8.2, the return conveyor 8 transfers the oversize material into the material flow, specifically into the material feed area. The oversize material can therefore be returned to the crusher unit 10 and crushed to the desired particle size.

Figure 2:
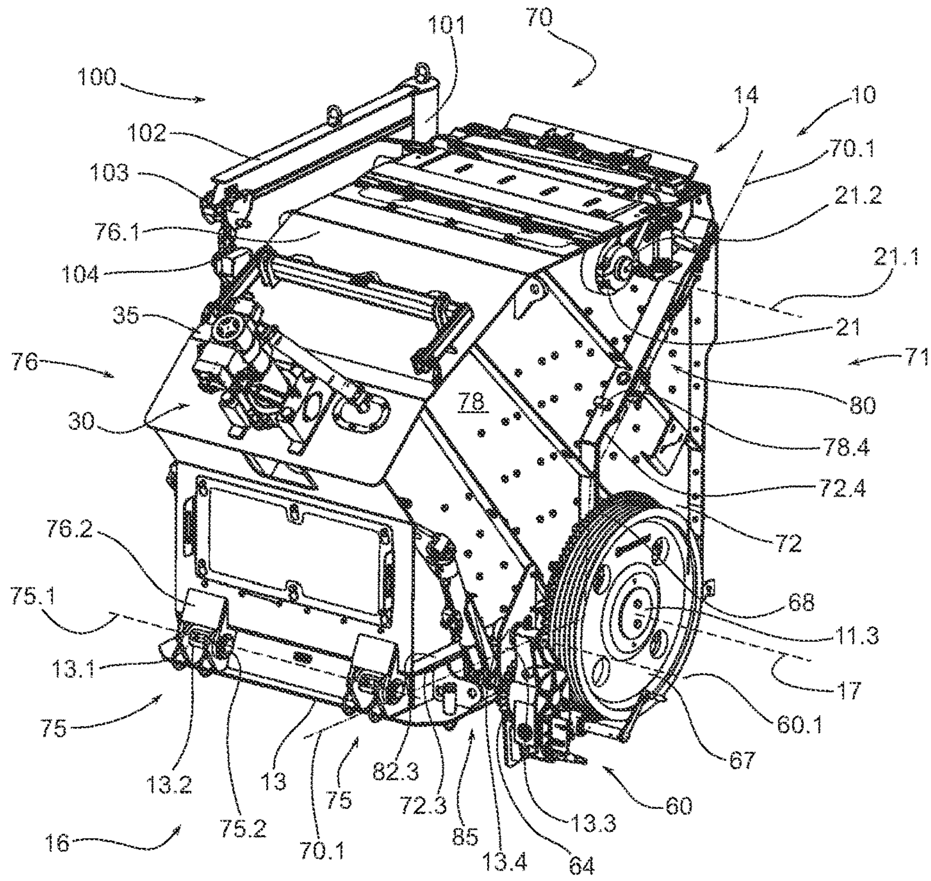
FIG. 2 shows a perspective view of a schematic representation of a crusher unit 10.

FIG. 2 shows a schematic representation of a material processing unit in the form of a crusher unit 10 having a housing 70.

The housing 70 may comprise an interior mounting space, which may be a crushing space 16.1 as in this case of a crusher unit 10. Material to be crushed can be routed into the crushing chamber 16.1 via a crusher inlet 14. Crushed material can exit the crushing chamber 16.1 via a crusher outlet 16. The crusher inlet 14 and the crusher outlet 16 may be provided as openings on the housing 70.

A movable tool may be at least partially housed inside the mounting space. The exemplary embodiment shown in the figures shows a crusher unit 10 in the form of a rotary impact crusher. Correspondingly, an impact rotor 11 may be provided inside the crushing chamber 16.1. The impact rotor 11 can be mounted for rotation about an axis of rotation 17 and have a rotor shaft 11.3.

A drive disk 67 can be coupled to the rotor shaft 11.3. The drive disk 67 can be designed as a belt pulley, as in this case. A drive 12 can be used to drive the impact rotor 11 via the drive disk 67, for instance by means of a belt drive. The drive 12, the drive disk 67 and/or the rotor shaft 11.3 can thus be parts of a drive train of the tool, in this case of the impact rotor 11.

A controller 200 can be provided by means of which the drive 12 can be controlled. Thus, the controller can be configured to transmit operating specifications, such as a desired speed, a desired power and/or a desired torque, to the drive 12, and to retrieve such available operating data from the drive 12 via a control line 204. The controller 200 may also be configured to activate and/or deactivate the drive 12.

Preferably, means, in particular sensors, can be provided on the tool or on the drive train to determine a state of motion of the tool, for instance a rotational sensor 206 may detect a rotational speed of the impact rotor 11. The motion status can be transmitted to and/or retrieved by the controller via signal line 208.

The drive disk 67 may comprise suitable means for enabling the engagement of a tool setting device 60. As shown here, the drive disk 67 may comprise a gear rim 68 for this purpose, which may be engaged with a pinion gear 64 of the tool setting device 60. The tool positioning device 60 can be used to secure the impact rotor 11 against unintended motion and/or move it in a controlled manner. The design and operation of one possible embodiment of the tool setting device 60 will be discussed in more detail below.

Furthermore, at least one impact rocker 20 can be accommodated inside the housing 70, as has already been explained with respect to FIG. 1. The impact rocker 20 can be mounted to swivel about a rocker axis 21.1. For instance, the impact rocker 20 may have a rocker shaft 21.2 that is mounted for rotation on the housing 70 by means of rocker bearings 21.

A crushing gap 15 may be formed between an end of the impact rocker 20 facing away from the rocker bearings 21 and an outer circumference of the impact rotor 11. A gap adjustment means 30 may be provided to permit the adjustment of the gap width of the crushing gap 15. For instance, this may be a hydraulic gap adjustment means 30 having a preferably double-acting gap adjustment cylinder and a piston rod adjustable relative to the gap adjustment cylinder. The gap adjustment means 30 may be coupled on the one hand to the housing 70 and on the other hand to the impact rocker 20 spaced apart from the rocker axis 21.1. Thus, an adjustment of the gap adjustment means 30 can cause the impact rocker 20 to swivel, thereby adjusting the gap width of the crushing gap 15.

The crusher unit 10 may further comprise an overload device 35. The overload device 35 may permit the impact rocker 20 to deflect, for instance, if there is non-crushable material in the crushing chamber 16.1. In such a case, the unbreakable material may exert a large force on the impact rocker 20, which may be transmitted to the gap adjustment means 30. Accordingly, the overload device 35 may preferably be coupled to the gap adjustment means 30. In particular, it may be a hydraulic overload device 35, such as an overload valve. The force acting on the gap adjustment means 30 in the event of an overload can cause an impermissibly high pressure inside the hydraulic gap adjustment cylinder. By means of the overload device 35, the pressure inside the gap adjustment cylinder can be at least partially relieved to deflect the impact rocker 20 away from the impact rotor 11. In this way, the crushing gap 15 can be enlarged permitting the non-crushable material to exit the crushing chamber 16.1.

As can be further seen in FIG. 2, the housing 70 may be divided along a housing partition 70.1 and may comprise a housing part 76 and another housing part 71. The crushing assembly 10 may further comprise a base element 13, which may provide a stable frame for supporting parts of the crushing assembly 10. For instance, the further housing part 71 can be connected to the base part 13 in a suitable manner, for instance by screwing. Also, swivel bearings for the rotor shaft 11.3 of the impact rotor 11 can be provided on the base part 13.

Figure 3:
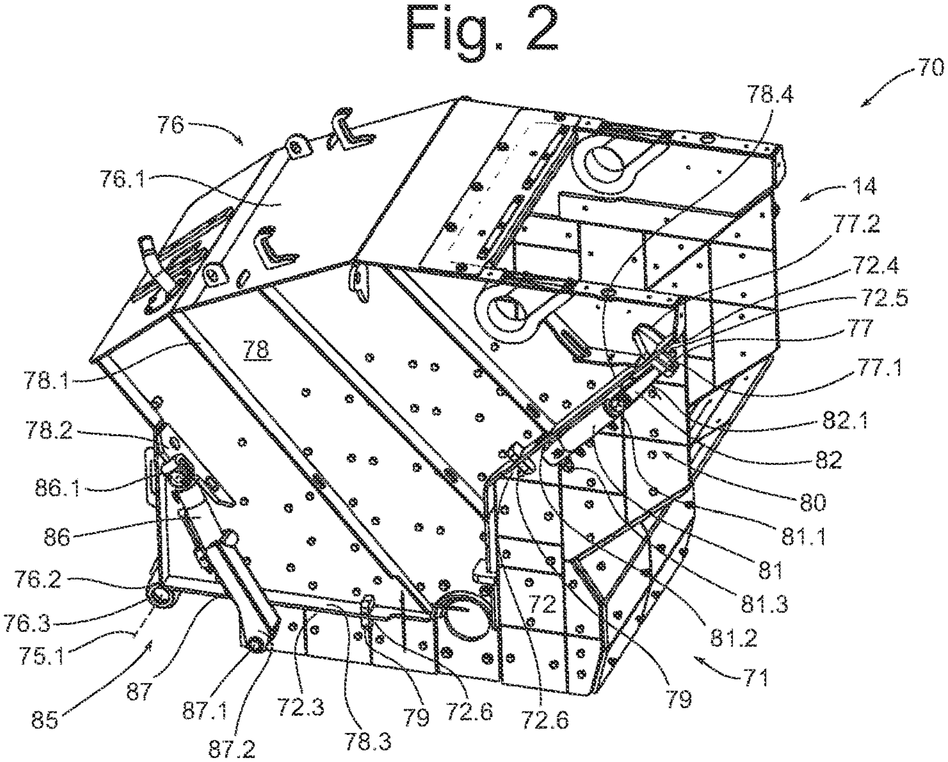
FIG. 3 shows a perspective view of a schematic representation of a housing 70.
Figure 4:
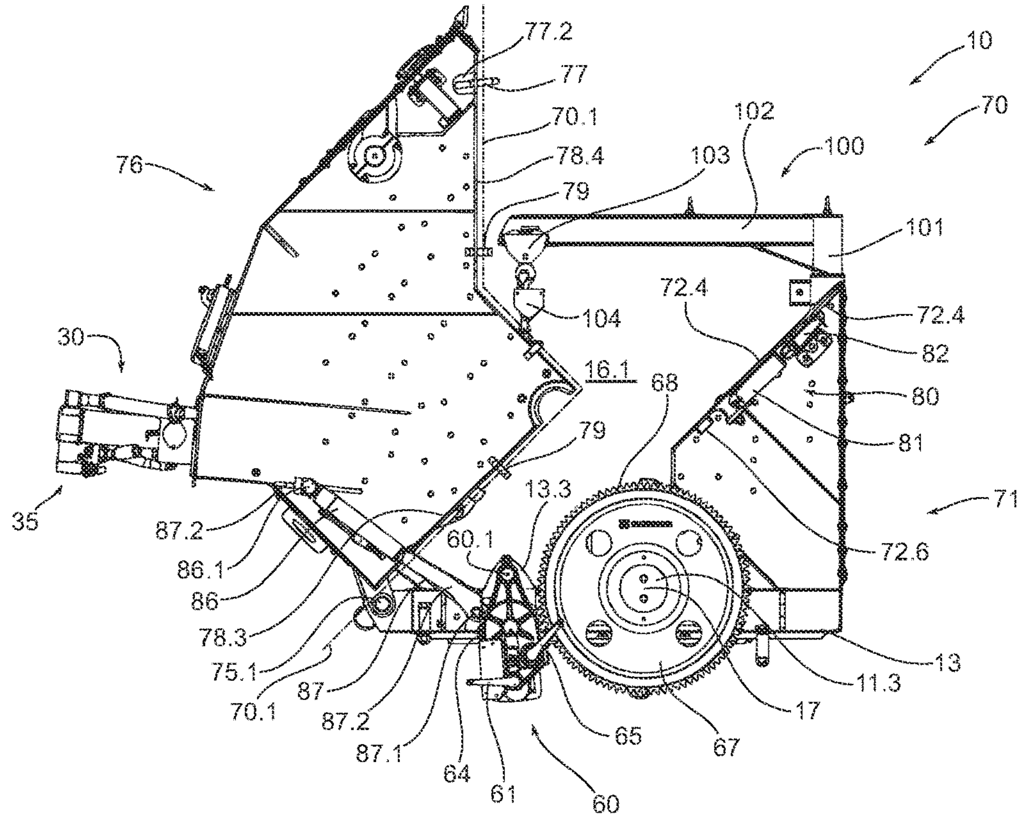
FIG. 4 shows a side view of a schematic representation of a crusher unit 10 with an open housing 70.

The housing part 76 may be movable between a closed position and an open position relative to the further housing part 71. According to the exemplary embodiment shown in the figures, the housing part 76 may be swivel mounted about a swivel axis 75.1 relative to the further housing part 71. Accordingly, the housing part 76 can be swiveled about the swivel axis 75.1 from the closed position as shown in FIGS. 2 and 3 to the open position as shown in FIG. 4. In so doing, the housing parts 76, 71 can be separated from each other at the housing partition 70.1.

In particular, at least one swivel bearing 75 may be provided to achieve swivelability of the housing part 76 relative to the further housing part 71. For this purpose, bearing attachment pieces 76.2 can be provided on the housing part 76, for instance (see FIG. 3). The bearing attachment pieces 76.2 may have passages 76.3 through which a bearing pin 75.2 of the swivel bearing 75 may be guided. On the other hand, the bearing bolt 75.2 can be guided through bearing bores 13.2 of bearing attachment pieces 13.1, which are directly or indirectly coupled to the further housing part 71. As present, the bearing attachment pieces 13.1 may be provided on the base part 13 of the crusher unit 10. However, it is also conceivable that the bearing attachment pieces 13.1 are provided on the further housing part 71.

As can be seen in FIG. 3, the housing part 76 may comprise a top wall 76.1 and two side walls 78. The housing partition 70.1 may be provided in the area of the side walls 78. The side walls 78 can be designed as sheets and have reinforcing elements 78.1, in this case in the form of ribs. First upper flanges 78.3 and second upper flanges 78.4 may be provided along the housing partition 70.1 on the side walls 78. The upper flanges 78.3, 78.4 can be angled away from the side wall 78, in particular angled at right angles. As shown here, the upper flanges 78.3, 78.4 can form a termination of the side wall 78 in the area of the housing partition 70.1.

The further housing part 71 may have, also in the area of the housing partition 70.1, first lower flanges 72.3 and second lower flanges 72.4. When the housing part 76 is in the closed position as shown in FIGS. 2 and 3, the housing parts 76, 71 and their flanges 78.3 and 72.3 plus 78.4 and 72.4 can lie on top of each other along the housing partition 70.1 at least in certain areas.

Also shown in more detail in FIG. 3 is a possible embodiment of a first actuator unit 80. The first actuator unit 80 may also be referred to as the first actuator 80. The first actuator unit 80 may be used in the closed actuation state to lock the housing element 76 in the closed position, and to unlock it in an unlocked actuation state. The first actuator unit 80 may comprise an actuator element 81 and a locking element 82 that can be moved relative to the actuator element 81. The actuator element 81 can be designed as a hydraulic cylinder, for instance. In that case, the locking element 82 can be coupled, for instance, as shown here, to a transmission element 81.1 designed as a piston rod.

The controller 200 can control the first actuator unit 80 via control signals sent over control line 210 and consequently cause a movement of the first actuator unit 80 between the locked actuation state and the unlocked actuation state.

The locking element 82 may interact with a counter locking element 77 to cause a locking action between the housing parts 71, 76. For this purpose, provision may be made for the first actuator unit 80 to be connected to one of the housing parts 71, 76 and for the counter locking element 77 to be connected to the other of the housing parts 71, 76. The counter locking element 77 may comprise a suitable mount to receive the locking element 82 when the first actuator unit 80 is moved to the locked actuation state.

As present, the counter locking element 77 can accordingly have a wedge mount 77.1, into which the locking element 82, designed as a wedge having a wedge surface 82.1, can be at least partially inserted. By the interaction of the wedge surface 82.1 with the wedge mount 77.1, an increasing tension between the locking element 82 and the counter locking element 77 in a direction perpendicular to the displacement path can be achieved at least in certain areas along the displacement path of the locking element 82 from the unlocked actuation state to the locked actuation state. Thus, the housing parts coupled to the first actuator unit 80 or to the counter locking element 77 can also be increasingly braced against each other.

A first sensor 212 may be assigned to the first actuator unit 80, which sensor 212 can detect at least the locked actuation state and/or the unlocked actuation state of the first actuator unit 80. Preferably this may be a displacement measuring system. However, it is also conceivable to use other types of sensors such as proximity sensors or light barriers. The actuation state of the first actuator unit 80 detected by the sensor 212 can be transmitted to the controller 200 via signal line 214.

Here, the first actuator unit 80 is coupled to the further housing part 71. For this purpose, a link 81.2 can be provided on the second lower flange 72.4 of the further housing part 71, to which the actuator element 81 of the first actuator unit 80 can be linked. For instance, the link 81.2 may represent a drilled hole in the second lower flange 72.4, in which a fastener 81.3, for instance a screw, may be received to achieve a fastening of the actuator element 81.

The counter locking element 77 may be coupled to the housing part 76, as in this case. For instance, the counter locking element 77 may be provided in the area of the second upper flange 78.4 of the housing part 76. In particular, a fastening section 77.2 of the counter locking element 77 may be connected, for instance welded, to the side wall 78 of the housing part 76. The counter locking element 77, in particular its wedge mount 77.1, can project beyond the housing partition 70.1 in the direction of the further housing part 71. An opening may be provided in the second lower flange 72.4 of the further housing part 71, through which the counter locking element 77 may be at least partially guided when the housing 70 is closed. The counter locking element 77, in particular its wedge mount 77.1, can thus be located in an area along the travel path of the first actuator unit 80.

As can be further seen in FIG. 3, the displacement path of the first actuator unit 80 may be oriented substantially along the second lower flange 72.4 and/or along the housing partition 70.1. Thus, the bracing action between locking element 82 and counter locking element 77 substantially perpendicular to the displacement path can advantageously cause bracing of the housing part 76 with the further housing part 71, in particular between the second upper flange 78.4 and the second lower flange 72.4.

Preferably, the coupling between the locking element 82 and the actuator element 81 can be designed to be compliant perpendicular to the displacement path in the direction of the bracing, for instance a swivel connection having a swivel axis oriented perpendicular to the travel path of the first actuator unit 80. In this case, it is particularly preferred to permit the swiveling of the locking element 82 by only a small angle, for instance less than 10°, less than 5° or at most 1°. In this way, dimensional tolerances can be compensated. Furthermore, the force optimized to move the locking element 82 to the closed actuation state can be converted into a bracing force between the housing parts 76, 71.

A second actuator unit 85 may be provided to make for a convenient and safe movement of the housing part 76 between the open and closed positions, as further shown in FIG. 3. The second actuator unit 85 may also be referred to as the second actuator 85. The second actuator unit 85 may comprise an actuator 86 and a transmission element 87 that can be moved relative to the actuator element 86. The actuator element 81 can, for instance, be designed as a, preferably double-acting, hydraulic cylinder. In that case, the transmission element 87 can be designed as a piston rod.

The second actuator unit 85 may be swivel coupled to the housing part 76, on the one hand, and swivel coupled to the further housing part 71, on the other hand. It is also conceivable that the second actuator unit 85 is swivel coupled to the housing part 76 on one hand and swivel coupled to the base part 13 on the other hand. In both cases, a movement of the second actuator unit 85 from a closed actuation state (cf. FIG. 3) to an open actuation state (cf. FIG. 4) can cause a movement of the housing part 76 from the closed position to the open position and vice versa.

The controller 200 can control the second actuator unit 85 and consequently cause a movement of the second actuator unit 85 between the open actuation state and the closed actuation state via control signals sent over control line 216.

A second sensor 218 that can detect at least the open actuation state and/or the closed actuation state of the second actuator unit 85 can be assigned to the second actuator unit 85. Preferably this may be a displacement measuring system. However, it is also conceivable to use other types of sensors such as proximity sensors or light barriers. The actuation state of the second actuator unit 85 detected by the sensor 218 can be transmitted to the controller 200 via signal line 220.

As shown herein, the actuator element 86 may be coupled to the housing part 76 by means of a swivel bearing 86.1. For this purpose, a linking element 78.2 may be provided on the side wall 78 of the housing part 76. The linking element 78.2 may be plate-shaped, for instance, and in particular welded to the side wall 78. The transmission element 87 may be coupled to the further housing part 71 by means of a swivel bearing 87.1. The second actuator unit 85, in particular the transmission element 87, can be at least partially covered by a cover 87.2 to reduce the risk of contamination or unintentional intervention by a user.

The housing 70 may further comprise one or more positioning elements 79 that can engage with assigned positioning apertures 72.6 to provide improved location between the housing parts 76, 71 in the closed position. As in the illustrated exemplary embodiment, the positioning elements 79 may be formed as lugs. For instance, the positioning elements 79 may be provided on the side wall 78 of the housing part 76 and project at least partially beyond the housing partition 70.1 toward the further housing part 71. Accordingly, the positioning apertures 72.6 may be disposed on the first lower flange 72.3 and/or on the second lower flange 72.4 of the further housing part 71. Of course, a reversed or combined arrangement is also conceivable.

FIG. 4 shows a schematic side view of an open housing 70. Thus, the housing part 76 is in the open position. As can be clearly seen in the figure, access to an interior of the housing 70, in this case to the crushing chamber 16.1, can be created in this way. This access can greatly facilitate maintenance work on components inside the housing 70. In particular, access can be provided to the tools, for instance to the impact rotor 11. For instance, an existing state of wear of the tool, for instance of the impact bars 11.2 provided on the impact rotor 11, can be examined.

As FIG. 4 further shows, the crusher unit 10 may comprise a lifting device 100. The lifting device 100 can be used, for instance, to lift parts to be replaced, such as impact bars 11.2, out of the crushing chamber 16.1 and/or into the crushing chamber 16.1. The lifting device 100 may comprise a column 101, to which a boom 102 is attached. Preferably, the column 101 may be swivel connected to the further housing part 71, more preferably to the base part 13. A traveling trolley 103 may be movably mounted along the boom 102. Lifting means 104, for instance in the form of a drive and/or a pulling means, such as a cable or chain, and/or a receiving means, such as a hook or clamp, may be provided on the traveling trolley 103 for connection to a part to be replaced. A part to be replaced can thus be connected to the pulling means by means of the pick-up means and lifted by the drive. A movement of the traveling trolley 103 and/or a swiveling of the boom 102 can be used to bring the part to be replaced into and/or out of the area of the crushing chamber 16.1.

Figure 5:
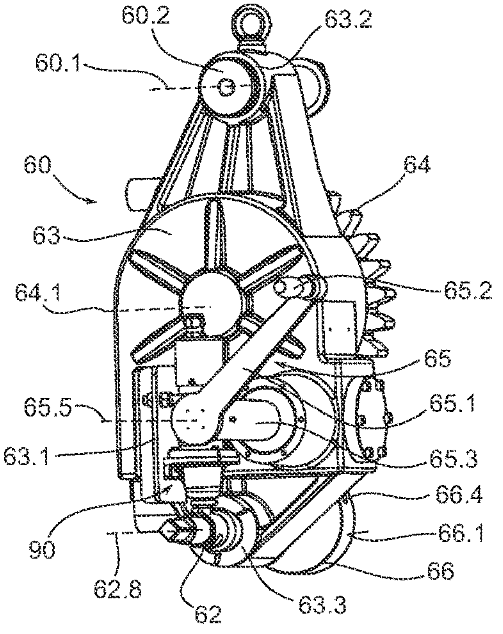
FIG. 5 shows a perspective view of a schematic representation of a tool setting device 60.

FIG. 5 shows an embodiment of the tool setting device 60 in more detail. The tool setting device 60 can be mounted to swivel about a swivel axis 60.1. For instance, the tool setting device 60 may have a base body 63, on which a bearing mount 63.2 is provided. A first end area of a bearing pin 60.2 can be mounted for rotation in the bearing mount 63.2. An opposite end area of the bearing bolt 60.2 may, for instance, be secured to the further housing part 71. Preferably, however, according to the exemplary embodiment shown, the opposite end area of the bearing pin 60.2 can be secured to a linking element 13.3, preferably in the area of a bearing point 13.4, of the base part 13 (see FIG. 2).

An eccentric shaft 62 can be mounted for rotation on the base body 63 spaced apart from the swivel axis 60.1. For this purpose, the base body 63 can have a bearing mount 63.3, in which the eccentric shaft 62 can be received. An eccentric disk 66 may be connected to the eccentric shaft 62 for co-rotation. The eccentric disk 66 can, for instance, have an eccentrically disposed drilled hole, which can be used to fit it onto an end area 62.3 (see FIG. 7) of the eccentric shaft 62.

It is conceivable that a fastening mount 62.4 is provided in the end area 62.3, which fastening mount is aligned flush with a fastening mount 66.4 of the eccentric disk 66. A fastener, for instance a pin, bolt or wedge, guided through both fastening mounts 62.4, 66.4 can thus create a connection for co-rotation between eccentric shaft 62 and eccentric disk 66.

A circumferential surface 66.1 of the eccentric disk 66 may slidably rest against an element of the further housing part 71 or the base part 13. For instance, a frame-like bearing for the eccentric disk 66 can be provided on the base part 13. Thus, a rotation of the eccentric shaft 62 about the eccentric axis 62.8 can cause a swiveling motion of the tool setting device 60 about the swivel axis 60.1.

Figure 7:
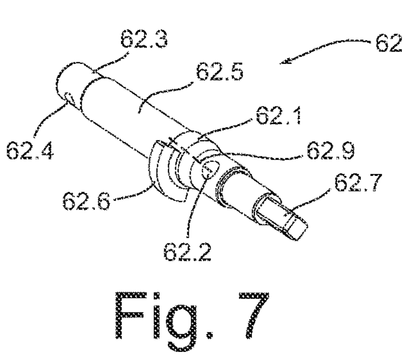
FIG. 7 shows a schematic perspective view of an eccentric shaft 62.

The eccentric shaft 62 can preferably be rotated manually, in particular by means of an operating element 61 (see FIG. 4). The operating element 61 may be designed to be a crank. A connection between the operating element 61 and the eccentric shaft 62 can be designed to be detachable. For instance, as can be seen in FIG. 7, the eccentric shaft 62 can have a form-fitting element 62.7, for instance in the form of a square section, which can be fitted to a matching element, for instance a square mount, of the operating element 61.

The eccentric shaft 62 may comprise a stop 62.6. The stop 62.6 can be designed as a radially projecting, circumferentially limited projection on a shaft 62.1 of the eccentric shaft 62. The stop 62.6 can prevent the eccentric shaft 62 from performing a rotation that exceeds the intended travel path of the tool setting device 60 between the engaged position and the release position. The stop 62.6 can come into contact with mating stops when a permissible travel path is reached. The counter stops can, for instance, be provided at the base body 63 of the tool setting device 60.

A sprocket 64 may be mounted for rotation about an axis of rotation 64.1 at the base body 63 of the tool setting device 60. Furthermore, the tool setting device 60 may comprise a setting means 65, which, as shown, may preferably be configured as a crank, more preferably comprising a lever 65.1 and a handle 65.2 preferably mounted for rotation on the lever 65.1. The setting means 65 may have a shaft 65.3, which is mounted for rotation on the base body 63 about an axis of rotation 65.5.

The tool setting device 60 may further comprise a gearbox capable of providing a transmission ratio between a rotation of the pinion 64 and a rotation of the shaft 65.3. Accordingly, a rotation of the shaft 65.3, for instance by an actuation of the setting means 65, in particular the crank, can cause a rotation of the pinion 64. Preferably, a self-locking gearbox can be used here. Accordingly, a gearbox may be used, which permits the pinion 64 to be driven by the setting means 65, but prevents the setting means 65 from being driven by the pinion 64. It is conceivable that a worm gear is used.

Thus, the tool positioning device 60 can be used to move the tool, in this case the impact rotor 11, independently of the drive 12. This can be particularly helpful in providing access to areas that are initially inaccessible. In the case of an impact rotor 11, for instance, these can be impact bars 11.2, which are located in a circumferential area below the axis of rotation 17 when the impact rotor 11 is in a present rotational position. They can be rotated upwards by a controlled rotation of the impact rotor 11, where they are more easily accessible.

Furthermore, the tool setting device 60 can prevent the tool, in this case the impact rotor 11, from moving unintentionally, in particular due to its self-locking design. Such unintentional motion can pose a significant risk of injury if persons have access to the crushing chamber 16.1 for maintenance work, for instance.

As further shown in FIG. 5, a third actuator unit 90 may be assigned to the tool setting device 60. The third actuator unit 90 may also be referred to as the third actuator 90. The third actuator unit 90 may be configured to lock the tool setting device 60 in the engaged position in an engagement actuation state. Accordingly, the third actuator unit 90 can be used to ensure that the tool is secured against unwanted motion.

Figure 6:
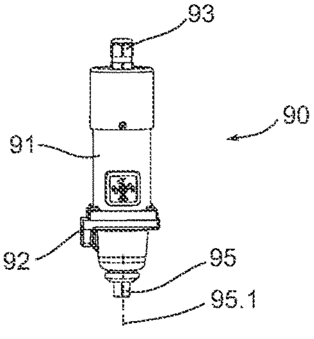
FIG. 6 shows a schematic representation of a third actuator unit 90.

FIG. 6 shows a possible exemplary embodiment of a third actuator unit 90 in more detail. Accordingly, the third actuator unit 90 may comprise a base body 91 and a locking means 95 movable relative to the base body 91 along a displacement path 95.1 between the engagement actuation state and the release actuation state.

The controller 200 can control the third actuator unit 90 via command signals sent over control line 222 and consequently cause a movement of the third actuator unit 90 between the engaged-actuation state and the released-actuation state.

Preferably, the third actuator unit 90 can be formed as a locking magnet, wherein the base body 91 comprises an electromagnet and an armature rod of the locking magnet comprises the locking means 95.

A third sensor 224 that can detect at least the engagement actuation state and/or the release actuation state of the third actuator unit 90 can be assigned to the third actuator unit 90. Preferably this may be a displacement measuring system. However, it is also conceivable to use other types of sensors such as proximity sensors or light barriers. The actuation state of the third actuator unit 90 detected by the sensor 224 can be transmitted to the controller via signal line 226.

A mounting section 92 may be provided on the base body 91 for linking it to the tool setting device 60. For instance, the fastening section 92 may comprise threaded holes that can be aligned with screw mounts on a fastening shoulder 63.1 of the tool setting device 60 to form a threaded connection. The third actuator unit 90 may thus be secured to the tool setting device 60 (see also FIG. 5).

The third actuator unit 90 may further comprise a connection area 93 for a power supply and/or communication with the sensor 224 and/or the controller 200.

A secure blocking of the tool setting device 60 in the engaged position can be achieved, for instance, as in this case, by permitting the locking means 95 of the third actuator unit 90 to engage with a mount 62.2 on the eccentric shaft 62 when the tool setting device 60 is in the engaged position. Preferably, the mount 62.2 is designed for this purpose as a recess matching at least in part the locking means 95 with a mounting axis 62.9 preferably aligned perpendicular to the eccentric axis 62.8. Thus, provision may be made for the pick-up axis 62.9 to be aligned with the displacement path 95.1 only when the tool setting device 60 is in the engaged position. Otherwise, a movement of the locking means 95 along the displacement path 95.1 from the release actuation state to the engagement actuation state would be blocked by an impact of the locking means 95 on the shaft 62.1 of the eccentric shaft 62. Accordingly, it can be ensured that the tool setting device 60 is in the engaged position, and thus the tool is secured against unwanted motion, when the third actuator unit 90 is in the engagement actuation state.

The operation of this exemplary embodiment will be explained in more detail below, with reference to a possible embodiment of an opening and closing process of the housing part 76.

When access to the interior of the housing 70 is to be provided, a user may initiate an opening operation via the controller 200. For instance, a user can issue an opening command via an operating panel 228 of the controller 200 or via an external input/output means 230.

The controller 200 can now ensure that the drive 12 is deactivated. For this purpose, it can deactivate the drive 12 and/or scan whether the drive 12 is already deactivated. Preferably, provision may be made for the controller 200 to scan a current motion state of the tool via rotational speed sensor 206.

When the drive 12 is deactivated, and preferably when the tool is at a standstill, the controller 200 may instruct the user, for instance via the operating panel 228 or the external input/output device 230, to move the tool setting device 60 to the engaged position.

Accordingly, the user can now swivel the tool setting device 60 about the swivel axis 60.1 from the release position to the engaged position by means of the operating element 61. The user may communicate to the controller 200 that the tool setting device 60 is in the engaged position. Alternatively, it is also conceivable that a sensor 232 is provided that determines a presence of tool positioning device 60 in the engagement and/or release position and transmits this to the controller 200 via signal line 234. It is also conceivable that the tool positioning device 60 is automatically moved into the engaged position upon control by the controller 200, for instance by an actuator.

When the tool setting device 60 is now in the engaged position, the controller 200 can control the third actuator unit 90 to move it from the release actuation state to the engagement actuation state. Accordingly, the locking means 95 can engage the mount 62.2 to lock the tool setting device 60 in the engaged position.

The actuation state determined by the sensor 224 assigned to the third actuator unit 90 can be transmitted to the controller 200 via signal line 226. When the third actuator unit 90 is in the engagement actuation state, the controller 200 can control the first actuator unit 80 over control line 210 to move it from the locked actuation state to the unlocked actuation state.

Accordingly, the locking of the housing parts 76, 71 may be released by disengaging the locking element 82 from the counter locking element 77.

The actuation state determined by the sensor 212 assigned to the first actuator unit 80 can in turn be transmitted to the controller 200 via signal line 214. When the unlocked actuation state is enabled, the controller 200 can control the second actuator unit 85 over control line 216 to change it from the closed actuation state to the open actuation state.

Thus, access to the interior of the housing 70 may now be provided.

The user can the again initiate a closing of the interior of the housing 70 via the controller 200 as previously described for the opening process.

The controller 200 can control the second actuator unit 85 via control signals over control line 216 to transfer it from the open actuation state to the closed actuation state. The actuation state as detected by second sensor 218 can in turn be transmitted via signal line 220 to the controller 200.

When the closed actuation state of the second actuator unit 85 is enabled, the controller 200 can control the first actuator unit 80 via control signals sent over control line 210 to move it to the locked actuation state to interlock the housing parts 76, 71. The actuation state as detected by first sensor 212 can again be transmitted over signal line 214 to the controller 200.

When the first actuator unit 80 is in the locked actuation state, the controller 200 can control the third actuator unit 90 via control signals sent over control line 222 to move it to the release actuation state. Accordingly, the locking means 95 may then be disengaged from the mount 62.2, permitting the tool setting device 60 to be moved from the engaged position to the release position.

For instance, the controller 200 may instruct the user to move the tool setting device 60 to the release position. It is also conceivable that the controller 200 could control an automated movement of the tool setting device 60 to the release position.

The closing process can now be completed.

The user can confirm to the controller 200 that the tool setting device 60 is in the release position, or, in particular in the case of an automated movement of the tool setting device 60, it can be automatically transmitted.

Driving the tool by the drive 12 may now be permissible. For instance, the drive 12 can be restarted by the controller 200, in particular at the instruction of the user.

The controller 200 includes or may be associated with a processor 236, a computer readable medium 238, a data base 240 and the input/output module or control panel 228 having a display 242. An input/output device 244, such as a keyboard, joystick or other user interface, is provided so that the human operator may input instructions to the controller. It is understood that the controller 200 described herein may be a single controller having all of the described functionality, or it may include multiple controllers wherein the described functionality is distributed among the multiple controllers.

Various operations, steps or algorithms as described in connection with the controller 200 can be embodied directly in hardware, in a computer program product 246 such as a software module executed by the processor 236, or in a combination of the two. The computer program product 246 can reside in RAM memory, flash memory, ROM memory, EPROM memory, EEPROM memory, registers, hard disk, a removable disk, or any other form of computer-readable medium 238 known in the art. An exemplary computer-readable medium 238 can be coupled to the processor 236 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 238 and/or database 240 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

The invention claimed is:

1. A material processing apparatus, comprising:

a housing including a first housing part movable between an open position and a closed position relative to a second housing part, the housing defining a mounting space accessible when the first housing part is in the open position;

at least one movable tool received in the mounting space of housing;

a drive configured to drive the at least one movable tool;

a first actuator configured in a locked actuation state to lock the first housing part in the closed position and configured in an unlocked actuation state to unlock the first housing part;

a second actuator configured to cause an opening movement of the first housing part, the second actuator being in a closed actuation state when the first housing part is in the closed position and in an open actuation state when the first housing part is in the open position;

a first sensor associated with the first actuator and configured to detect the actuation state of the first actuator and to generate a first actuation state signal corresponding to the actuation state of the first actuator;

a second sensor associated with the second actuator and configured to detect the actuation state of the second actuator and to generate a second actuation state signal corresponding to the actuation state of the second actuator; and a controller configured to receive the first and second actuation state signals and to provide control signals to control the drive and the first and second actuators such that the controller prevents the first housing part from moving into the open position when the tool is being driven by the drive and/or the controller prevents the at least one movable tool from being driven by the drive when the first housing part is in the open position.

2. The material processing apparatus of claim 1, wherein:

the controller is configured to permit movement of the second actuator only when the first actuator is in the unlocked actuation state.

3. The material processing apparatus of claim 2, further comprising:

a drive train between the drive and the at least one movable tool;

tool setting device having an engaged position engaged with the drive train such that the tool setting device in the engaged position prevents driving of the at least one movable tool by the drive and/or prevents a motion of the at least one movable tool caused by inertial forces; and a third actuator movable between an engagement actuation state and a release actuation state, wherein in the engagement actuation state the third actuator blocks the tool setting device in the engaged position and wherein in the release actuation state the third actuator releases the tool setting device.

4. The material processing apparatus of claim 3, wherein:

the controller is configured to permit the at least one movable tool to be driven by the drive only when the first actuator is in the locked actuation state, the second actuator is in the closed actuation state, and the third actuator is in release actuation state.

5. The material processing apparatus of claim 3, wherein:

the controller is configured to permit the first actuator to be moved into the unlocked actuation state and/or to permit the second actuator to be moved into the open actuation state only when the third actuator is in the engagement actuation state.

6. The material processing apparatus of claim 3, wherein:

the controller is configured to permit the first actuator to be moved into the unlocked actuation state and/or to permit the second actuator to be moved into the open actuation state and/or to permit the third actuator to be moved into the engagement actuation state only when the at least one movable tool is not being driven by the drive.

7. A material processing apparatus, comprising:

a housing including a first housing part movable between an open position and a closed position relative to a second housing part, the housing defining a mounting space accessible when the first housing part is in the open position;

at least one movable tool received in the mounting space of housing;

a drive configured to drive the at least one movable tool;

a first actuator configured in a locked actuation state to lock the first housing part in the closed position and configured in an unlocked actuation state to unlock the first housing part;

a second actuator configured to at least permit an opening movement of the first housing part, the second actuator being in a closed actuation state when the first housing part is in the closed position and in an open actuation state when the first housing part is in the open position;

a first sensor associated with the first actuator and configured to detect the actuation state of the first actuator and to generate a first actuation state signal corresponding to the actuation state of the first actuator;

a second sensor associated with the second actuator and configured to detect the actuation state of the second actuator and to generate a second actuation state signal corresponding to the actuation state of the second actuator; and a controller configured to receive the first and second actuation state signals and to provide control signals to control the drive and the first and second actuators such that the controller prevents the first housing part from moving into the open position when the tool is being driven by the drive and/or the controller prevents the at least one movable tool from being driven by the drive when the first housing part is in the open position;

wherein the first actuator includes a hydraulic cylinder and a piston rod movable relative to the hydraulic cylinder between the locked actuation state and the unlocked actuation state, and the first actuator includes a locking element moved by the piston rod; and wherein the material processing apparatus further includes a counter locking element configured to receive the locking element in a frictional and/or form-locked connection such that the first and second housing parts are interlocked in the closed position in the locked actuation state of the first actuator.

8. The material processing apparatus of claim 7, wherein:

the locking element includes a wedge surface;

the counter locking element includes a wedge mount;

wherein the locking element is guided at least partially into the wedge mount such that a wedge connection is formed by the interaction of the locking element with the counter locking element to interlock the first and second housing parts in the closed position during a movement of the first actuator from the unlocked actuation state to the locked actuation state when the first housing part is in the closed position.

9. The material processing apparatus of claim 1, wherein:

the second actuator includes a hydraulic cylinder and a piston rod movable relative to the hydraulic cylinder between the open actuation state and the closed actuation state, wherein the hydraulic cylinder is swivel connected to one of the first and second housing parts and the piston rod is swivel connected to the other of the first and second housing parts.

10. A material processing apparatus, comprising:

a housing including a first housing part movable between an open position and a closed position relative to a second housing part, the housing defining a mounting space accessible when the first housing part is in the open position;

at least one movable tool received in the mounting space of housing;

a drive configured to drive the at least one movable tool;

a first actuator configured in a locked actuation state to lock the first housing part in the closed position and configured in an unlocked actuation state to unlock the first housing part;

a second actuator configured to at least permit an opening movement of the first housing part, the second actuator being in a closed actuation state when the first housing part is in the closed position and in an open actuation state when the first housing part is in the open position;

a first sensor associated with the first actuator and configured to detect the actuation state of the first actuator and to generate a first actuation state signal corresponding to the actuation state of the first actuator;

a second sensor associated with the second actuator and configured to detect the actuation state of the second actuator and to generate a second actuation state signal corresponding to the actuation state of the second actuator;

a controller configured to receive the first and second actuation state signals and to provide control signals to control the drive and the first and second actuators such that the controller prevents the first housing part from moving into the open position when the tool is being driven by the drive and/or the controller prevents the at least one movable tool from being driven by the drive when the first housing part is in the open position;

a drive train between the drive and the at least one movable tool;

a tool setting device configured to be swiveled about a swivel axis between an engaged position and a release position, wherein in the engaged position the tool setting device is engaged with the drive train such that the tool setting device prevents driving of the at least one movable tool by the drive and/or prevents a motion of the at least one movable tool caused by inertial forces; and wherein the tool setting device includes an eccentric shaft mounted for rotation about an eccentric axis spaced apart from the swivel axis, and the tool setting device includes a manual operating element configured to rotate the eccentric shaft such that rotation of the eccentric shaft causes a swiveling of the tool setting device between the release position and the engaged position.

11. The material processing apparatus of claim 10, further comprising:

a third actuator including an electromagnet and an armature rod movable relative to the electromagnet between an engagement actuation state and a release actuation state, wherein in the engagement actuation state the armature rod blocks the tool setting device in the engaged position and wherein in the release actuation state the armature rod releases the tool setting device.

12. The material processing apparatus of claim 11, wherein:

the eccentric shaft includes a mount formed by a bore in the eccentric shaft oriented along a mounting axis perpendicular to the eccentric axis; and the armature rod is configured to engage the mount in the engagement actuation state to block rotation of the eccentric shaft about the eccentric axis, and the armature rod is configured such that the armature rod can only engage the mount when the tool setting device is in the engaged position wherein a displacement path of the armature rod is aligned with the mounting axis.

13. The material processing apparatus of claim 10, wherein:

the tool setting device is configured such that a manual operation of the tool setting device can cause movement of the at least one movable tool.

14. The material processing apparatus of claim 10, wherein:

the drive train includes a drive disk including a gear rim;

the tool setting device includes a pinion gear configured to be engaged with the gear rim of the drive disk in the engaged position of the tool setting device; and the tool setting device includes a crank having a crankshaft, and a gearbox configured to translate rotation of the crankshaft into rotation of the pinion gear, wherein the gearbox is self-locking such that a rotation of the crankshaft cannot be caused by a rotation of the pinion gear.

15. A method of opening and closing a material processing apparatus, the apparatus including:

a housing including a first housing part movable between an open position and a closed position relative to a second housing part, the housing defining a mounting space accessible when the first housing part is in the open position;

at least one movable tool received in the mounting space of housing;

a drive configured to drive the at least one movable tool;

a first actuator configured in a locked actuation state to lock the first housing part in the closed position and configured in an unlocked actuation state to unlock the first housing part;

a second actuator configured to cause an opening movement of the first housing part, the second actuator being in a closed actuation state when the first housing part is in the closed position and in an open actuation state when the first housing part is in the open position;

a first sensor associated with the first actuator and configured to detect the actuation state of the first actuator and to generate a first actuation state signal corresponding to the actuation state of the first actuator;

a second sensor associated with the second actuator and configured to detect the actuation state of the second actuator and to generate a second actuation state signal corresponding to the actuation state of the second actuator;

a controller configured to receive the first and second actuation state signals and to provide control signals to control the drive and the first and second actuators;

wherein the method comprises:

opening the housing by deactivating the drive, determining the actuation state of the first actuator with the first sensor, transmitting the actuation state of the first actuator to the controller, controlling the first actuator with the controller to move the first actuator into the unlocked actuation state, determining the actuation state of the second actuator with the second sensor, transmitting the actuation state of the second actuator to the controller, and controlling the second actuator with the controller to move the second actuator into the open actuation state to cause the opening movement of the first housing part; and closing the housing by determining the actuation state of the second actuator with of the second sensor, transmitting the actuation state of the second actuator to the controller, controlling the second actuator with the controller to move the second actuator to the closed actuation state to cause a closing movement of the first housing part and determining the actuation state of the first actuator with the first sensor, transmitting the actuation state of the first actuator to the controller and actuating the first actuator with the controller to move the first actuator to the locked actuation state.

16. The method of claim 15, wherein the material processing apparatus further includes a drive train between the drive and the at least one movable tool, a tool setting device having an engaged position engaged with the drive train such that the tool setting device in the engaged position prevents driving of the at least one movable tool by the drive and/or prevents a motion of the at least one movable tool caused by inertial forces, and a third actuator movable between an engagement actuation state and a release actuation state, wherein in the engagement actuation state the third actuator blocks the tool setting device in the engaged position and wherein in the release actuation state the third actuator releases the tool setting device, the method further comprising:

in the opening of the housing, before the first actuator is moved into the unlocked actuation state, moving the third actuator into the engagement actuation state; and in the closing of the housing, after the first actuator has been moved into the locked actuation state, moving the third actuator into the release actuation state.

* * * * *